UNITED STATES PATENT OFFICE.

SARAH JANE DIFFEE, OF TEMPLE, TEXAS.

SOAP POWDER.

1,260,346.  Specification of Letters Patent.  Patented Mar. 26, 1918.

No Drawing.  Application filed November 24, 1917. Serial No. 203,769.

*To all whom it may concern:*

Be it known that I, SARAH JANE DIFFEE, a citizen of the United States, residing at Temple, in the county of Bell and State of Texas, have invented a new and useful Soap Powder, of which the following is a specification.

This invention relates to soap powder, one of the objects being to provide a soap powder which will dissolve quickly and can be used in all kinds of water, said powder making fabrics white and easy to iron.

With the foregoing and other objects in view the composition consists of the following ingredients substantially in the proportions mentioned:—

| | |
|---|---|
| Wood ash lye | 4 gallons. |
| Soap grease | 7 pounds. |

The foregoing ingredients are boiled together for about four hours until it saponifies, water being added as needed.

While the mixture is boiling there is added thereto one quart of liquid made from the leaves of peach trees. This liquid is produced by boiling three ounces of peach tree leaves in a gallon of water for ten minutes.

After the mixture of lye, grease and peach tree liquid has boiled for about five minutes, soda ash is added to the mixture until said mixture is reduced to a stiff mass after which it is forced through a screen and thus reduced to a powdered form.

It has been found that by utilizing in the manufacture of the powder a liquor made by boiling the leaves of peach trees, fabrics washed with the powder are rendered very white and can be ironed easily.

In using the soap powder the same is placed in boiling water until sufficient suds have been produced after which the fabrics to be cleaned are placed in the boiling water and left there for about ten minutes. They can then be removed and dried without further cleaning.

What is claimed is:—

A composition of matter for use in washing fabrics, which includes a mixture of soft soap and a liquor produced by boiling the leaves of peach trees, the mixture being reduced to a stiff mass by adding soda ash.

In testimony that I claim the foregoing as my own, I have hereto affixed my signature in the presence of two witnesses.

SARAH JANE DIFFEE.

Witnesses:
DANIEL B. BOONE,
J. N. RATCLIFF.